United States Patent [19]
Crosby et al.

[11] Patent Number: 5,793,426
[45] Date of Patent: Aug. 11, 1998

[54] VIDEO COMPRESSION ENHANCEMENT

[75] Inventors: Philip S. Crosby, Portland; T. Naveen, Beaverton; Ali Tabatahai, Beaverton; Charles H. Van Dusen, Beaverton, all of Oreg.

[73] Assignee: Tektronix, Inc., Wilsonville, Oreg.

[21] Appl. No.: 669,064

[22] Filed: Jun. 24, 1996

[51] Int. Cl.$^6$ .................................................. H04N 7/12
[52] U.S. Cl. .................... 348/390; 348/384; 348/478; 348/435; 382/232
[58] Field of Search ...................... 348/390, 22, 469, 348/496, 565, 625, 434, 435, 478, 384; 382/232

[56] References Cited

U.S. PATENT DOCUMENTS

| | | | |
|---|---|---|---|
| 3,950,607 | 4/1976 | Southworth et al. | 348/22 |
| 4,641,202 | 2/1987 | Nakamura et al. | 386/5 |
| 4,652,908 | 3/1987 | Fling et al. | 348/625 |
| 4,720,744 | 1/1988 | Washi et al. | 348/469 |
| 4,750,039 | 6/1988 | Willis | 348/565 |
| 4,912,549 | 3/1990 | Altman et al. | 348/496 |
| 5,065,243 | 11/1991 | Katagiri | 348/565 |
| 5,452,006 | 9/1995 | Auld | 348/390 |

*Primary Examiner*—Tommy P. Chin
*Assistant Examiner*—Frank Snow
*Attorney, Agent, or Firm*—Francis I. Gray

[57] ABSTRACT

An enhanced video data compressor has a composite video signal decoder that changes the state of a field identification signal in response to a vertical interval indicator in composite video data which is in a digital video format. Thereafter a vertical timing pulse is generated to prepare a compression encoder to acquire data. By counting lines from the vertical timing pulse the decoder sets a horizontal timing signal at a one macroblock line interval prior to active video data so that the compression encoder acquires video data from the vertical interval as well as active video data. At the end of each field the acquired data is processed by the compression encoder to produce compressed video data.

1 Claim, 2 Drawing Sheets

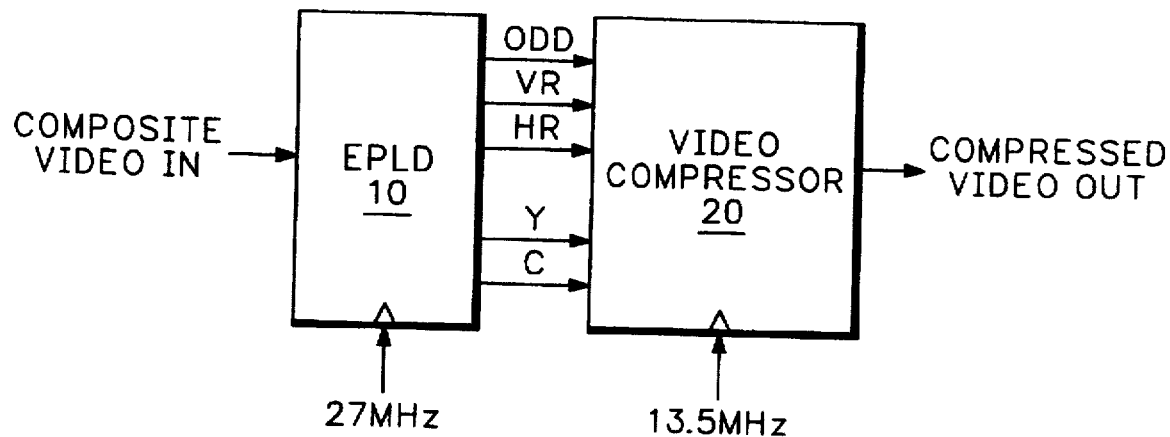
FIG.1
IDENTIFIER DATA WORD
| 7 | 6 | 5 | 4 | · · · |
|---|---|---|---|---|
| 1 | (F) | (V) | (H) | |
SAV: H=0
EAV: H=1
FIG.2
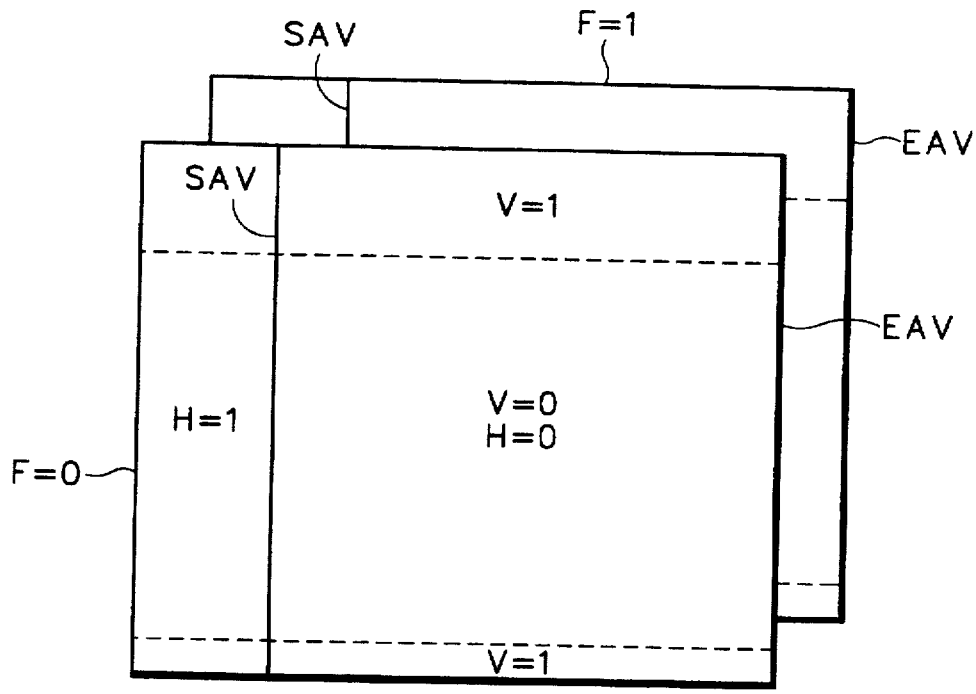
FIG.3

VIDEO COMPRESSION ENHANCEMENT

BACKGROUND OF THE INVENTION

The present invention relates to compression of a video signal, and more particularly to a realtime video compression enhancement that provides for compression of a portion of the vertical interval of each field of the video signal as well as the full active video portion.

A current MPEG I-frame (intraframe) compressor, including an encoder chip manufactured by International Business Machines, Inc. of White Plains, N.Y. and a composite video signal decoder chip manufactured by Philips International, B. V. of Eindhoven, The Netherlands, compression encodes solely the active video portion of a video signal. The encoder chip encodes integer multiples of 16 lines by 16 pixels (16×16 macroblocks), and thus encodes 480 lines (240 lines per field) by 720 or fewer (in integer multiples of 16) pixels per line of the active interval for NTSC, for example. The analog composite signal (S-Video) is input to the decoder chip and decoded to provide appropriate timing signals (ODD, VR, HR) to the compressor encoder chip as well as digital luminance and chrominance streams. Each line of the video signal starts with a start of active video (SAV) identification sequence, followed by the video data words, and ends with an end of active video (EAV) identification sequence, followed by auxiliary data words such as digital audio. The compressor encoder chip operates on the video data words between the SAV and EAV sequences, performing the actual processing in the interval between EAV of the last line of one field and SAV at the beginning of the active video of the other field.

However for certain applications it is desirable to pass through low bit rate information that is contained in the vertical interval of the video signal, such as vertical interval time synchronization (VITS) and vertical interval time code (VITC). Current decoder chips, such as the Philips SAA7111, provide a VR timing signal during the vertical interval between fields. Since the ODD timing signal cannot change while the VR signal is asserted, and the field indicator changes after the start of the vertical interval, only the active video data is available for acquisition by the compressor encoder chip as the ODD timing signal does not change until the end of the vertical interval.

What is desired is an enhanced video compressor that provides timing and video data information for the compressor encoder that enables the processing of data that is within the vertical interval of the video data.

SUMMARY OF THE INVENTION

Accordingly the present invention provides an enhanced video compressor in the form of an erasable programmable logic device (EPLD) as a decoder that provides appropriate timing signals and luminance and chrominance data signals to a compressor encoder chip. The EPLD detects the start of the vertical interval and immediately changes the state of an ODD timing signal to indicate a field change. Then the EPLD asserts a vertical timing signal to initiate the compressor encoder chip to receive data from the new field. After counting an appropriate number of lines the EPLD asserts a horizontal timing signal to cause the encoder chip to acquire video data starting one macroblock within the vertical interval, i.e., 16 lines prior to the start of active video lines. In this manner 512 lines of video data, including a portion of the vertical interval, are compressed instead of just 480 lines of active video data for NTSC.

The objects, advantages and other novel features of the present invention are apparent from the following detailed description when read in conjunction with the appended claims and attached drawing.

BRIEF DESCRIPTION OF THE DRAWING

FIG. 1 is a block diagram view of an enhanced video compressor according to the present invention.

FIG. 2 is a representation of the most significant bits of the identifier data words in the SAV/EAV identification sequences of a digital video format.

FIG. 3 is a pictorial representation of two fields subdivided according to the SAV/EAV sequences.

DESCRIPTION OF THE PREFERRED EMBODIMENT

Figure 4:
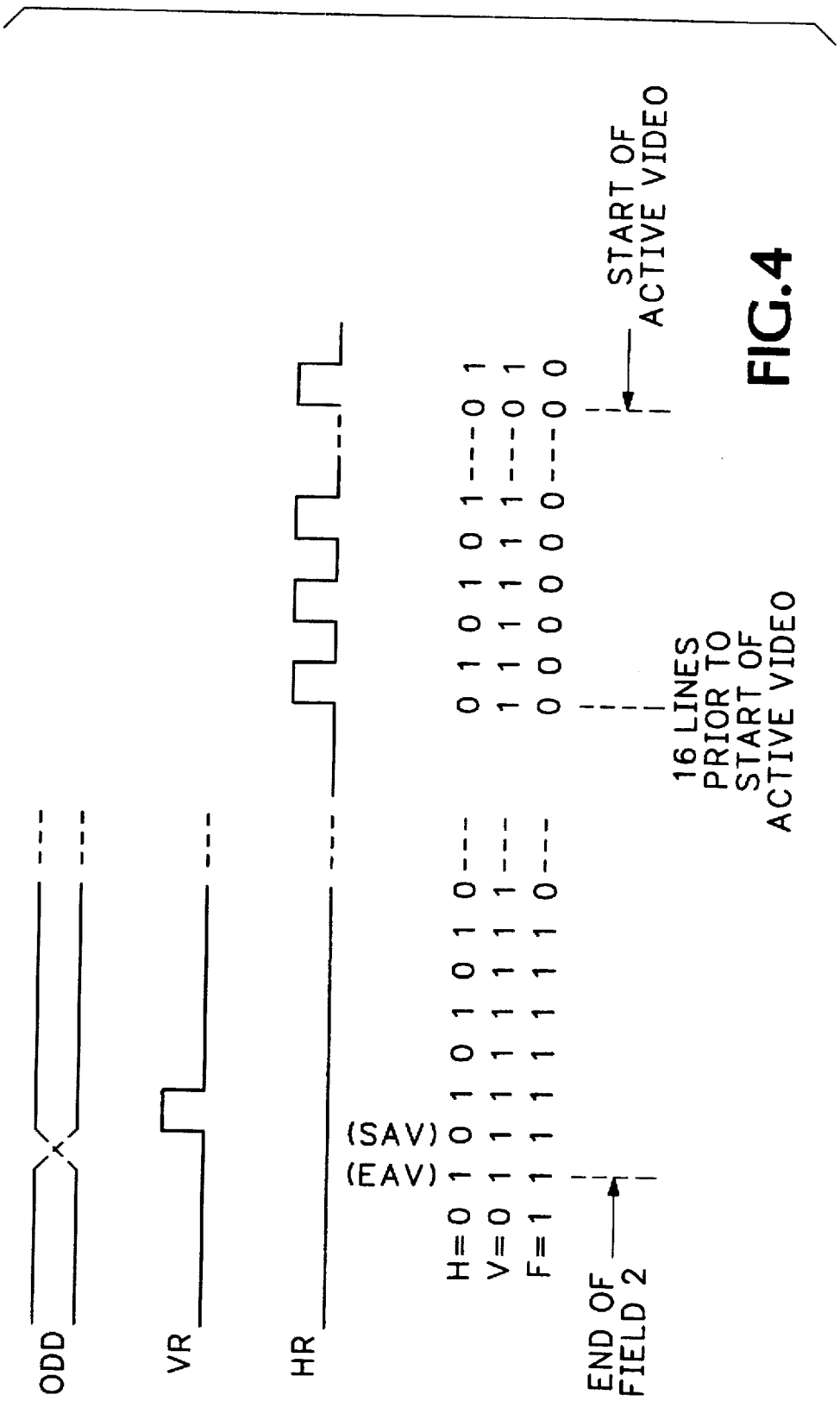
FIG. 4 is a timing diagram view for the enhanced video compressor according to the present invention.

Referring now to FIG. 1 a composite digital video signal in an appropriate video format is input to an erasable programmable logic device (EPLD) 10. The EPLD 10 is clocked at the digital video clock rate, such as 27 MHz. Output from the EPLD 10 are timing signals ODD, HR, VR and a luminance Y and a chrominance C data signal. The ODD signal is a field indicator, the VR is a start of vertical interval signal, and the HR signal is a video data acquisition signal. The outputs from the EPLD 10 are input to a compression encoder 20 which is clocked at one-half the digital video clock rate, such as 13.5 MHz. The output from the compression encoder 20 is compressed digital video data.

As shown in FIG. 2 the most significant bits of the identifier data word within the SAV or EAV sequences for a particular video format are (1)(F)(V)(H), where F indicates the field within a frame of the video data, V indicates whether the video line is within the vertical interval, and H indicates whether the video data is within the horizontal interval. The states of the F, V and H bits are shown in FIG. 3, where F=0 is field 1 and F=1 is field 2, V=1 is the vertical interval and H=1 is the horizontal interval. Thus for active video V=H=0.

When one field of video data is completed, the V bit becomes a "1", indicating the vertical interval. However the F bit does not change for another few lines, as shown in FIG. 3. The compression encoder 20 requires the vertical timing signal VR from the EPLD 10 to be zero in order to recognize the change in the field bit and start acquiring video data. Therefore in the prior decoders as discussed above, where the vertical timing signal merely reflects the state of the V bit, the change in the F bit is not recognized until the end of the vertical interval so that the ODD timing signal changes at the start of the active video data. Thus only the active video data is processed by the compression encoder 20. However the EPLD 10, as shown in FIG. 4, is programmed to detect when the vertical interval starts (V=1) at the EAV of the last line of the prior field, and to change the ODD timing signal to reflect the field change immediately, even though the F bit has not yet changed state. At the next SAV the vertical timing signal VR goes high, indicating to the compression encoder 20 to prepare to process video data for the next field. At the EAV of that first line, VR goes low even though V=1. The EPLD 10 then counts lines by counting EAV sequences until the start of the macroblock that exists in the vertical interval immediately prior to the active video data lines, i.e., 16 lines before the beginning of the active video. At the beginning of the vertical interval macroblock the horizontal timing signal HR goes high and the compression encoder 20 starts acquiring data for the next field. In this way an additional 16 lines of video data per field, for a total of 512 out of 525 video lines of NTSC, for example, are processed each field.

Thus the present invention provides an enhanced video compression of video data by decoding the video data to alert the compression encoder at the beginning of the vertical interval of a field change based on the vertical interval bit, and then starting the acquisition by the compression encoder a macroblock interval of lines prior to the start of the active video data.

What is claimed is:

1. A method of compressing video data in digital format comprising the steps of:

changing the state of a field identification signal at the beginning of a vertical interval;

generating a vertical timing pulse immediately succeeding the change of state of the field identification signal;

counting a number of lines from the vertical timing pulse to generate a horizontal timing pulse to start acquisition of video data by a compression encoder a macroblock interval of lines prior to active video data; and compression encoding the acquired video data at the end of each field of video data to produce compressed video data for each field.

* * * * *